United States Patent [19]

Fujimoto et al.

[11] Patent Number: 4,768,474
[45] Date of Patent: Sep. 6, 1988

[54] TWO-CYCLE MOTOR HAVING A FUEL INJECTION SYSTEM FOR MARINE PROPULSIONS

[75] Inventors: Hiroaki Fujimoto; Hiroshi Tomita; Tomohiro Kanamaru; Katsumi Torigai, all of Hamamatsu, Japan

[73] Assignee: Sanshin Kogyo Kabushiki Kaisha, Hamamatsu, Japan

[21] Appl. No.: 918,778

[22] Filed: Oct. 14, 1986

[30] Foreign Application Priority Data

Oct. 14, 1985 [JP] Japan .................................. 60-226987

[51] Int. Cl.⁴ ........................................... F02B 33/04
[52] U.S. Cl. .................................. 123/73 B; 123/481; 123/198 F
[58] Field of Search ...................... 123/478, 481, 73 C, 123/73 B, 198 F

[56] References Cited

U.S. PATENT DOCUMENTS

| | | | |
|---|---|---|---|
| 3,190,271 | 6/1965 | Gudmundsen | 123/59 BM |
| 4,040,395 | 8/1977 | Demetrescu | 123/481 |
| 4,146,006 | 3/1979 | Garabedian | 123/481 |
| 4,357,924 | 11/1982 | Sugasawa et al. | 123/481 |
| 4,391,255 | 7/1983 | Staerzl | 123/481 |
| 4,398,520 | 8/1983 | Schulz et al. | 123/481 |
| 4,469,071 | 9/1984 | Bassi et al. | 123/481 |
| 4,470,390 | 9/1984 | Omori et al. | 123/481 |
| 4,509,488 | 4/1985 | Forster et al. | 123/481 |
| 4,530,332 | 7/1985 | Harvey et al. | 123/481 |
| 4,541,387 | 9/1985 | Morikawa | 123/481 |
| 4,545,346 | 10/1985 | Grow | 123/65 VD |

FOREIGN PATENT DOCUMENTS 2,126,159 12/1971 Fed. Rep. of Germany .... 123/73 B
0027731 3/1978 Japan .................................. 123/73 A Primary Examiner—Charles J. Myhre
Assistant Examiner—David A. Okonsky
Attorney, Agent, or Firm—Ernest A. Buetler

[57] ABSTRACT

An arrangement for controlling a two-cycle marine engine having a fuel injection system wherein the firing frequency of the cylinders is reduced under low speed running so as to improve fuel economy and engine performance by improving scavenging while the firing intervals between the cylinders is maintained uniform. The invention is disclosed as being applied to a number of variations of multiple cylinder engines and may be employed with spark ignited or diesel engines since the ignition system of the engine per se is not affected.

6 Claims, 4 Drawing Sheets 4,768,474

TWO-CYCLE MOTOR HAVING A FUEL INJECTION SYSTEM FOR MARINE PROPULSIONS

BACKGROUND OF THE INVENTION

This invention relates to a two-cycle motor having a fuel injection system for marine propulsion and more particularly to an improved arrangement for improving the efficiency and providing smooth low speed running for a two-cycle internal combustion engine.

As is well known, two-cycle internal combustion engines have a number of advantages. One of these advantages is the high output for a given specific weight because, unlike a four-cycle engine, the two-cycle engine fires each of its cylinders for each revolution of the crankshaft. With a four-cycle engine, the cylinders of the engine fire only once every second revolution of the crankshaft. However, the common form of two-cycle crankcase compression internal combustion engine employs a porting arrangement for transferring the intake charge from the crankcase where it is compressed to the combustion chamber where it is burned and then exhausted. In order to provide good power output, there is considerable overlap between the valve porting and this gives rise to poor running at low engine speeds. In many applications, a two-cycle is required to run at low speeds.

One of the prime applications for two-cycle engines is as the power unit of an outboard motor. As is well known, outboard motors are run at low engine speeds during conditions such as trolling. Under these running conditions, the two-cycle engine can provide poor fuel economy and uneven running because of the fact that a substantial portion of the intake charge may pass out the exhaust port without having been burned or a large portion of the exhaust gases may remain in the chamber and prevent the induction of sufficient fresh charges for good smooth running.

Devices have been proposed to try to improve the efficiency of two-cycle engines at low running speeds. Such devices operate upon the ignition system so as to cause misfiring of one or more cylinders under such low speed conditions. This misfiring will insure against poor fuel economy because the misfired cylinder has two cycles through which it can purge its combustion chamber and draw in a fresh charge before firing. However, when a multiple cylinder engine has less than all of its cylinders misfired, very rough running can occur because the firing impulses are no longer equal. That is, if one or more of the cylinders are misfired, the even firing impulses of the engine are upset and objectionable vibrations can occur.

It is, therefore, a principal object of this invention to provide an improved arrangement for insuring good fuel economy of a two-cycle engine during low speed running without causing irregular firing impulses.

It is a further object of this invention to provide an arrangement for insuring good low speed fuel economy without attendant irregular firing impulses.

Even if the engine fuel economy is improved by causing misfiring of the spark plugs, the arrangement for insuring the misfiring complicates the ignition circuitry and can give rise to the possibility of ignition system failures or malfunctions. In addition, this method cannot be employed in connection with two-cycle diesel engines that do not employ an ignition system.

It is, therefore, a still further object of this invention to provide an arrangement for insuring good fuel economy of a two-cycle engine at low speeds without the necessity of altering the ignition timing.

It is a yet further object of this invention to provide an improved arrangement for controlling the low speed fuel economy of a two-cycle engine that is independent of the ignition system and hence may be used with diesel engines.

SUMMARY OF THE INVENTION

This invention is adapted to be embodied in an internal combustion engine having a plurality of cylinders, fuel delivery means for delivering fuel for combustion to each of the cylinders and means for reducing the amount of fuel delivered to all of the cylinders in response to a predetermined condition sufficient to prevent combustion at each normal combustion internal for effecting firing of the individual cylinders at less than the normal firing interval while maintaining the regular firing interval between the cylinders.

The invention is also adapted to be embodied in a method of operating an engine having a plurality of cylinders and a fuel delivery means for delivering fuel for combustion to each of the cylinders. In accordance with the method, the amount of fuel delivered to all of the cylinders is reduced in response to a predetermined condition. The amount of fuel reduction is sufficient to prevent combustion at each normal combuston interval for effecting firing of the individual cylinders at less than the normal firing interval while maintaining the regular firing interval between the cylinders.

BRIEF DESCRIPTION OF THE DRAWINGS

FIG. 6A shows a three cylinder engine.
FIG. 6B shows a two cylinder engine.
FIG. 6C shows a four cylinder engine.
FIG. 6D shows a five cylinder engine.
FIG. 6E shows a six cylinder engine.

DETAILED DESCRIPTION OF THE PREFERRED EMBODIMENTS

Figure 1:
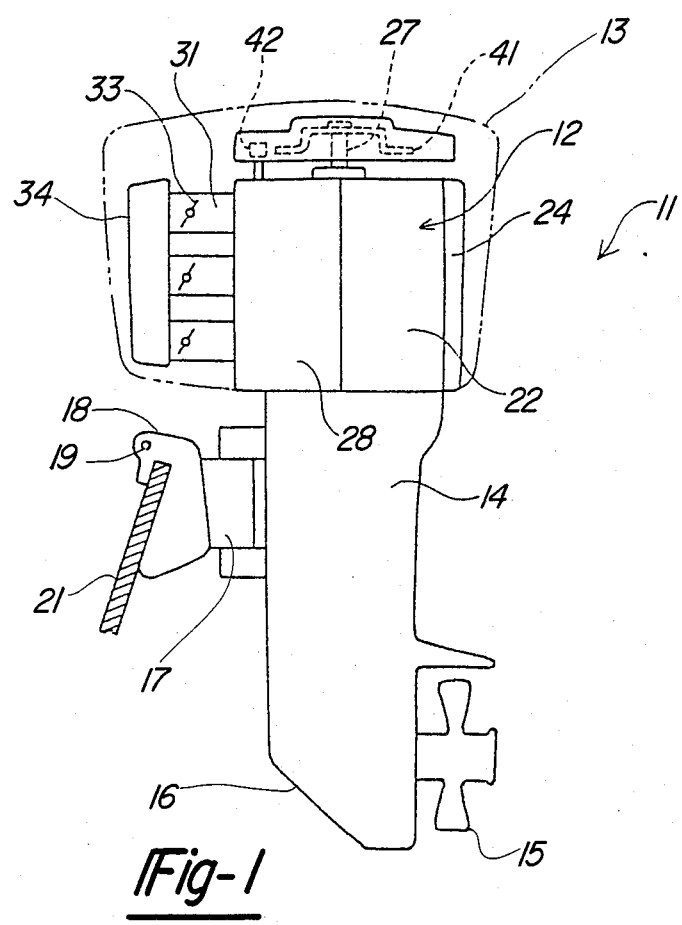
FIG. 1 is a side elevational view of an outboard motor constructed in accordance with an embodiment of the invention, with portions shown in phantom and illustrating the outboard motor attached to the transom of an associated watercraft, which transom is shown in phantom.

Referring now in detail to the drawings and first primarily to FIG. 1, an outboard motor constructed in accordance with an embodiment of this invention is identified generally by the reference numeral 11. Although the invention is described as being embodied in an outboard motor, it is to be understood that it is susceptible of use in a wide variety of aplications. However, since outboard motors normally employ two-cycle crankcase compression engines, and this invention has particularly applicability with such engines, the application of the invention to an outboard motor is a fairly typical example of how the invention may be used.

The outboard motor 11 includes an internal combustion engine, indicated generally by the reference numeral 12, and constructed in accordance with an embodiment of the invention. The engine 12 of the two-stroke, crankcase compression type and, in the illustrated embodiment, is depicted as having an inline three cylinder configuration. It is to be understood and, as will be described, the invention is capable of use with engines of other cylinder numbers and configurations.

The engine 12 is contained within an outer protective cowling, shown in phantom in FIG. 1 and identified by the reference numeral 13, and, together with this protective cowling, comprises a power head. The engine 12 has an output shaft, to be described later, which drives a drive shaft (not shown) that is rotatably journaled within a drive shaft housing 14 that depends from the power head consisting of the engine 12 and the protective cowling 13. This drive shaft drives a propeller 15 through a suitable forward, neutral, reverse transmission (not shown) which is contained within a lower unit 16 that is affixed to the drive shaft housing 14 in a known manner.

The drive shaft housing 14 is connected to a swivel bracket 17 for steering movement about a generally vertically extending axis in a known manner. The swivel bracket 17 is, in turn, connected to a clamping bracket 17 by means of a horizontally extending pivot pin 19 for tilting movement of the outboard motor 11 about the horizontally disposed pivot axis defined by the pivot pin 19. The clamping bracket 18 is, in turn, affixed in a known manner to a transom 21 of an associated watercraft.

The construction of the outboard motor 11 as thus far described may be considered to be conventional. Since the invention relates to the construction and operation of the engine 12, the detailed configuration, construction and details of the outboard motor 11 have not been illustrated and will not be described. As has been noted, the invention can be utilized in conjunction with any of the conventional types of outboard motors or, for that matter, for any other type of application in which a two-cycle engine is normally employed.

Figure 2:
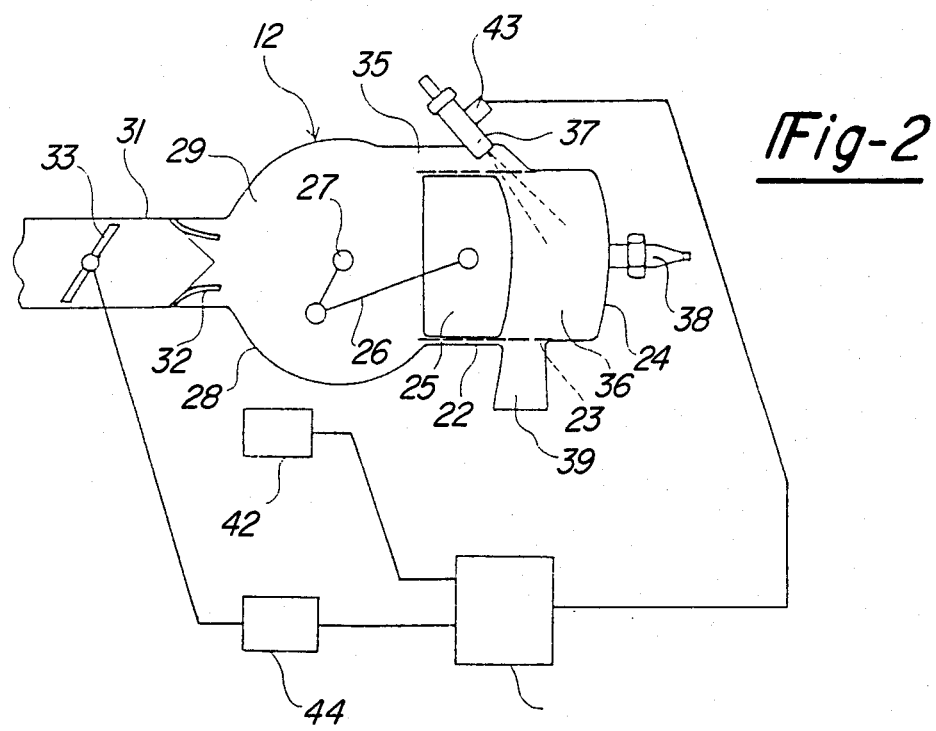
FIG. 2 is a partially schematic horizontal cross-sectional view through a single cylinder of the engine on an enlarged scale.

Referring now additionally to FIG. 2, the engine 12 includes a cylinder block 22 that, in accordance with this embodiment, is comprised of three aligned cylinders. Each cylinder of the engine is provided with individual cylinder bores 23 (three in this embodiment) that are closed at their upper ends by means of a cylinder head 24. The cylinder heads 24 are affixed to the cylinder blocks 22 in any appropriate manner. A piston 25 is slidably supported in each cylinder bore 23 and is connected by means of a connecting rod 26 to a crankshaft 27 for driving the crankshaft 27 upon reciprocation of the pistons 25. The crankshaft 27 is rotatably journaled between the cylinder block 22 and a crankcase 28 that is affixed in a known manner to the cylinder block 22. The crankshaft 27 has separate throws for each cylinder and these throws are angularly related to provide evenly spaced firing impulses of 120 degrees (see FIG. 6A).

In accordance with normal multiple cylinder, two-cycle crankcase compression engine practice, a crankcase chamber 29 is provided in the crankcase 28 beneath each piston 25 and the individual crankcase chambers 29 are appropriate sealed from each other. An air inlet charge is delivered to each of the crankcase chambers 29 by means of respective runners 31 of an induction manifold through reed-type check valves 32. The reed-type check valves 32 insure that the intake charge will not be driven back through the intake manifold passages 31 during periods when the pressure in the individual crankcase chambers 29 are greater than atmospheric. Throttle valves 33 are provided in each of the runners 31 for controlling the air flow to the crankcase chambers 29 and, accordingly, the speed of the engine 12.

The intake charge that is admitted to the individual crankcase chambers 29 during the upstroke of the pistons 25 is compressed when the pistons 25 begin their downward stroke. The thus compressed air charge is transferred through one or more scavenge or transfer ports 35 to the combustion chambers 36 that are formed in the area of the cylinder bores 23 above the heads of the pistons 25 and beneath the cylinder heads 24. A fuel charge is added to the transferred air charge by means of a plurality of injection nozzles 37, each of which is disposed in one of the combustion chambers 36. In the illustrated embodiment, the injection nozzles 37 discharge through the outlet ports of the scavenge passages 35 directly into the combustion chambers 36. It is to be understood, however, that various other discharge arrangements and fuel injection nozzle locations may be utilized in conjunction with the invention.

A spark plug 38 is provided in each cylinder head 24 above the combustion chamber 36 for firing the fuel/air charge thus delivered to the combustion chambers 36. The burnt charge is discharged from the combustion chambers 36 through exhaust ports 39. This charge is then delivered to the atmosphere through any suitable exhaust system. In accordance with normal outboard engine practice, this exhaust system may include an expansion chamber disposed within the drive shaft housing 14 and a high speed underwater exhaust which discharges through the propeller 15 in a known manner. However, it is to be understood that the specific type of exhaust gas discharge employed is not critical to the invention.

The system for firing the spark plugs 38 includes a magneto generator that includes a rotating flywheel carrying one or more permanent magnets, which flywheel is identified generally by the reference numeral 41. A plurality of pulser coils 42 are supported by either the cylinder block 22 or crankcase 28 in proximity to the flywhel 41 at the appropriately angularly spaced locations for triggering the ignition circuit in a known manner.

The construction of the engine 12 and, as previously noted, that of the outboard motor 11, may be considered to be conventional. Therefore, further details of the construction and operation of the elements as thus far described are not believed to be necessary to the understanding of the application of the invention to various engines.

As is well known, although two-cycle internal combustion engines tend to have high specific outputs for a given displacement and weight at maximum RPM, they tend to operate unevenly and with poor fuel economy at low speeds. The reason for this is that at such running conditions, there is not good scavenging of all of the exhaust gases and a substantial residual charge remains in the combustion chamber 36 from cycle to cycle. This large residual charge of burnt combustion products results in uneven firing and poor running. Although this may be compensated for to some extent by providing large degrees of scavenging, there is also the risk that such scavenging will cause a large proportion of the fresh fuel/air intake charge to be delivered out of the exhaust ports 39. In any event, there is always the risk that the individual exhaust charge transferred out of the exhaust ports 39 during each cycle, particularly at low speed running, will contain a large amount of unburned fuel. Thus, there is not only the problem of poor stability of running at low speeds but conventional engines tend to have high fuel consumption under these running conditions. In accordance with this invention, an arrangement is provided for insuring that there is a minimum discharge of unburned fuel from the exhaust ports 39 under such running conditions. Furthermore, this is accomplished, in accordance with the illustrated and described invention, without resulting in uneven firing impulses and attendant vibrations and unsatisfactory operation.

In the normal engine operation, the fuel injectors 37 for each of the engine cylinders discharges in a regular interval at 120 degrees relative to each other and in the normal firing order sequence. In order to achieve this result, the pulser coil 42 associated with each cylinder outputs a signal to a controller, indicated schematically at 43 in FIG. 2, which, in turn, outputs a signal to a control actuating coil 40 of the fuel injector 37 so as to achieve fuel discharge. The controller 43 also receives a throttle angle position signal from a throttle position sensor 44 so as to control the amount of fuel discharged. In order to do this, the timing of the opening of the fuel injection nozzle 37 by its electrical controller 40 is adjusted to crankshaft angle, engine load and throttle position in a well known manner. At the same time, the spark plugs 38 are fired at the appropriate time as sensed by the individual pulser coils 42.

In accordance with the invention, a misfiring of the engine is achieved so that the cylinders will still fire at a regular interval, however, the duration of the interval is increased so that the cylinders do not fire once every revolution. This has the effect of improving the fuel economy while still maintaining even firing impulses and good running.

Figure 3:
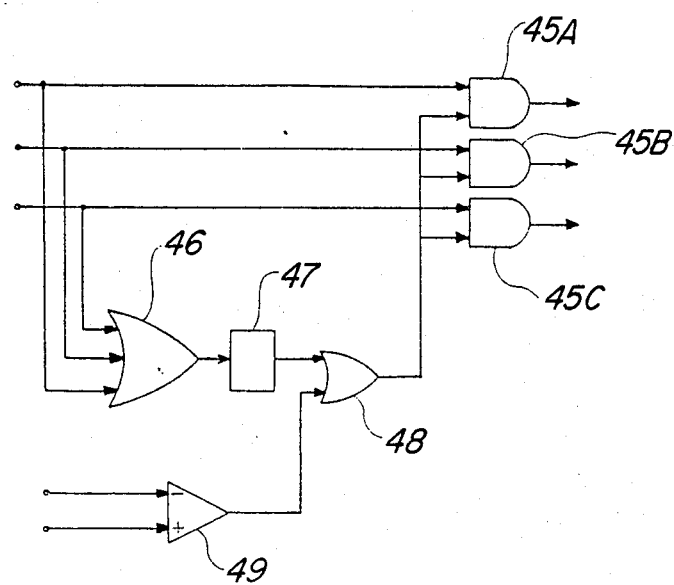
FIG. 3 is a schematic view showing the circuitry for controlling the fuel injection in accordance with an embodiment of the invention.
Figures 4, 5:
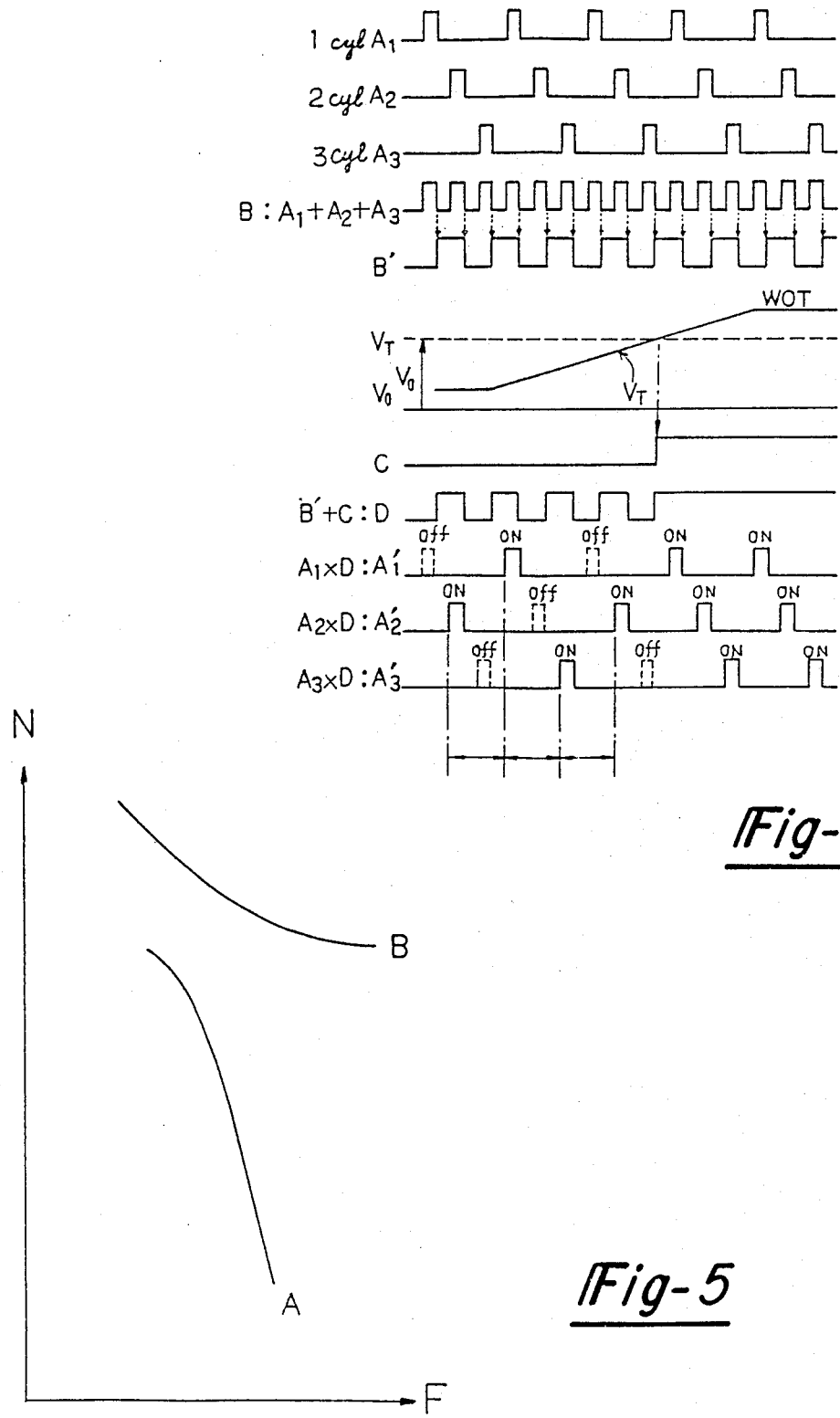
FIG. 4 is a pulse diagram showing how the device operates to cause misfiring of the engine through controlling the fuel injection.
FIG. 5 is a graph showing engine speed in relation to fuel consumption for an engine constructed in accordance with an embodiment of the invention and a conventional engine.

FIG. 3 shows a digital control that may be incorporated within the controller 43 for achieving this result and FIG. 4 is a pulse diagram to show the outputs at the various points in the circuit and explain how the device operates to change the firing timing and intervals. In these figures, the regular timing pulse signals from the pulser coils 42 associated with each of the three cylinders are indicated at $A_1$, $A_2$ and $A_3$. It will be noted from FIG. 4 that these pulses occur each revolution of the engine (360 degrees) and the individual spacing of the pulses is 120 degrees from each other so as to achieve equal firing intervals for the engine 12.

In accordance with the invention, the signals $A_1$, $A_2$ and $A_3$ are transmitted to one gate of respective AND circuits 45A, 45B and 45C. In addition, the pulses $A_1$, $A_2$ and $A_3$ are transmitted to respective gates of an OR circuit 46 which outputs a signal B each time a pulse $A_1$, $A_2$ or $A_3$ is transmitted to it. Thus, the output pulse B occurs for each 120 degrees of crankshaft revolution.

The output of the OR circuit 46 (B) is delivered to a flip-flop circuit 47 that is designed so that it will transmit an output signal each time the input signal changes from a positive signal to no signal. Therefore, the output of the flip-flop 47, indicated at B', will provide a signal at each 240 degrees.

The output signal B' from the flip-flop 47 is transmitted to one gate of an OR circuit 48. The other gate of the OR circuit 48 receives a speed responsive signal from a comparator 49. The comparator 49 is designed so that it will output a signal only when actual engine speed $V_T$ exceeds a preset engine speed $V_O$. The speed signals may be generated in any known manner and may, in fact, be determined by the position of the throttle valve 33 as provided for by the throttle valve sensor 44. The preset speed $V_T$ may be set by the operator or may be preset at the factory as the speed at which misfiring is no longer necessary to provide a good running condition. The output of the comparator 49 is indicated at C. This output, as has been noted, is transmitted to the other gate of the OR circuit 48.

The OR circuit 48 outputs a signal D which is transmitted to the respective AND circuits 45A, 45B and 45C. The outputs of the AND circuits 45A, 45B and 45C (indicated as signals $A'_1$, $A'_2$ and $A'_3$, respectively) is transmitted to the control devices 40 for the fuel injection nozzles 37 of the respective cylinders.

When the engine is operating above the preset speed $V_T$, the OR circuit 48 will output a constant signal D and hence the AND circuits 45A, 45B and 45C will output a signal $A'_1$, $A'_2$ and $A'_3$, respectively, each time an input signal $A_1$, $A_2$ and $A_3$ is received from the respective AND circuit. Thus, the fuel injection of the engine will be normal and each injector nozzle 37 will be discharged in the normal firing order sequence so that there will be firing of each cylinder for each revolution of the crankshaft 27.

However, when the speed falls below the preset speed $V_T$, the OR circuits 48 will not receive the signal C from the comparator circuit 49 and hence will output a signal D only each time the flip-flop 47 outputs a signal B'. As shown in the lower three curves of FIG. 4, therefore, the AND circuits 45A, 45B and 45C will only receive signals D and $A_1$, $A_2$ and $A_3$, respectively, every 240 degrees of crankshaft revolution, twice the normal cycle. In addition, it should be noted that the firing order will be changed from 1, 2, 3 to 1, 3, 2. However, the firing will still occur on regular intervals and smooth operation will result.

The described arrangement has actually been found to improve fuel consumption for a given low speed as shown in FIG. 5 wherein engine speed is indicated at N and specific fuel consumption is indicated at F. It will be seen that with a normal engine A, as the speed decreases, the fuel consumption substantially increases. Although a generally same characteristic is true with respect to an engine operating under this principle, as shown by the curve B, the fuel consumption decrease is not so great and the engine speed is higher for a given fuel consumption. Therefore, at the same low engine speeds (for example, as during trolling), an engine operating on the principle of this invention will enjoy substantially greater fuel economy. This is because the fact the engine is fired only on every other crankshaft revolution promotes better scavenging at low engine speeds without fuel loss because the scavenging is achieved with pure air rather than with a fuel/air mixture.

Figure 6:
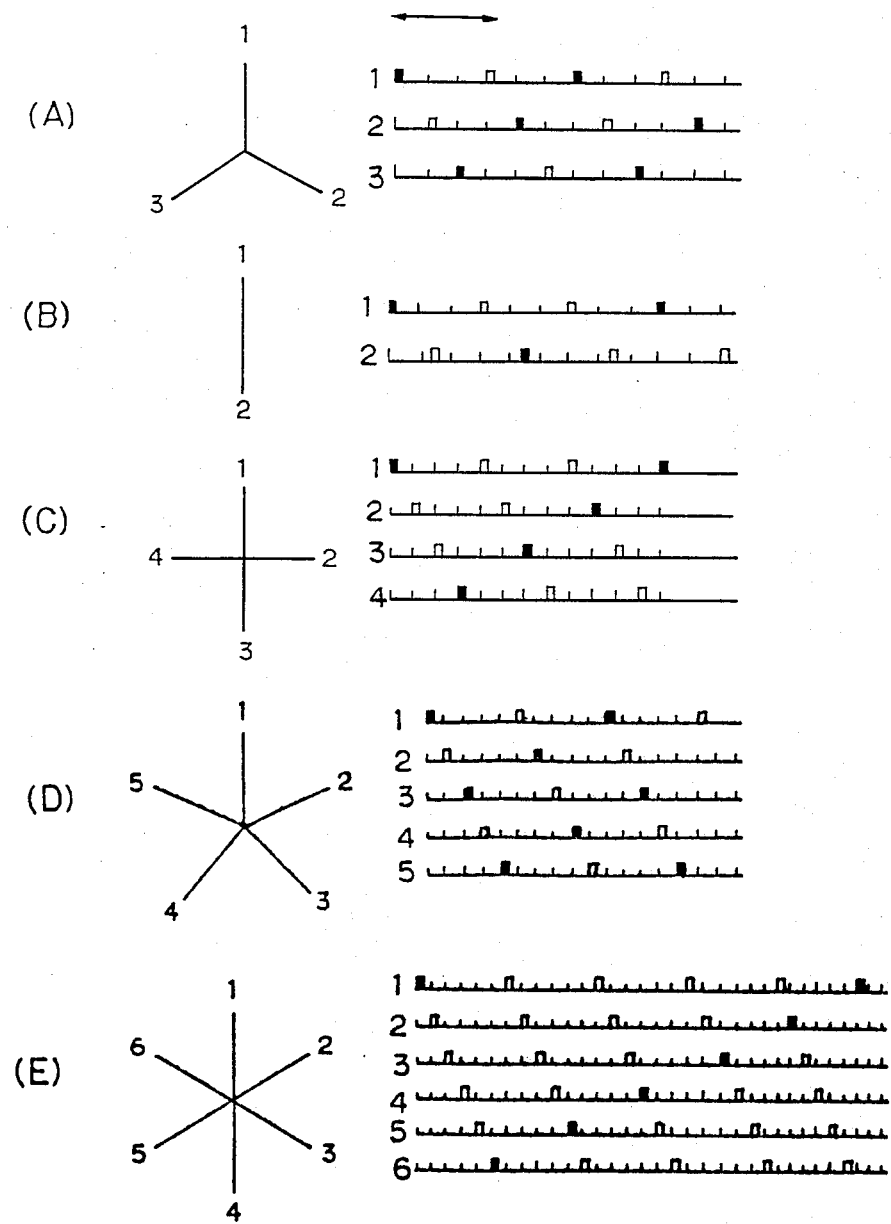
FIGS. 6A–6E are views showing the application of the principle to engines having different numbers of cylinders.

Although the invention has been described so far in conjunction with an inline three cylinder type of engine, the invention has the same applicability to engines having other numbers of cylinders as shown in FIGS. 6B through 6E. In the embodiment thus far described, the control circuitry for the fuel injectors operates in such a manner as to cause injection of fuel from the nozzles only once every second revolution of the crankshaft. It is to be understood that other timing arrangements may be employed for varying the timing of the injection nozzles so that the engine will not fire once each revolution of the crankshaft. For example, FIG. 6B shows the application of the principle to a two cylinder inline engine firing at 180 degree normal impulses. In this embodiment, the injection nozzles are controlled at low speeds so as to inject only once every third revolution of the engine. Thus, the engine will still fire on even firing impulses but will not fire for every crankshaft revolution.

FIG. 6C shows the application of the principle to a four cylinder inline engine, FIG. 6D shows the application of the principle to a five cylinder inline engine and FIG. 6E shows the application of the principle to a six cylinder inline engine.

Figure 7:
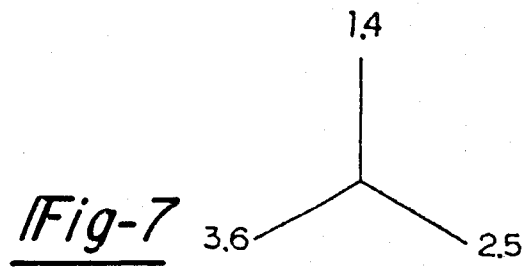
FIG. 7 is a diagrammatic view showing the firing order of the cylinders constructed in accordance with an embodiment of the invention as applied to a V6 engine.

The invention also may be practiced in conjunction with V6 engines which will have a firing impulse similar to that of FIG. 6E but wherein the cylinder firing order is indicated in FIG. 7 where the normal firing order is 1, 2, 3, 4, 5, 6 with each cylinder firing normally at 120 degrees. In this regard, the six cylinder engine may be considered as equivalent to two, three cylinder engines of the type as already disclosed.

Although the invention has been described in conjunction with spark ignited types of engines, it should be noted that the invention does not affect the ignition system of the engine and, for that reason, the principle is operative independently of the manner in which the engine cylinders and fuel/air mixture therein is ignited. Therefore, the principle will operate equally as well with diesel type of engines.

Although a number of embodiments of the invention have been illustrated and described, it should be readily apparent that various changes and modifications may be made without departing from the spirit and scope of the invention, as defined by the appended claims.

What is claimed is:

1. In a two-cycle crankcase compression internal combustion engine having a plurality of cylinders, means for delivering an air charge to the crankcase of said engine, scavenge passage means extending from said crankcase to each of said cylinders for transferring an air charge from said crankcase to said cylinders, fuel injection means for delivering fuel for combustion to said cylinders, and means for reducing in a predetermined sequence the amount of fuel delivered to all of said fuel injection means in response to a predetermined condition sufficient to prevent combustion in each cylinder at its normal combustion interval of that cylinder for effecting firing of the individual cylinders at greater than the normal firing interval of the individual cylinder while maintaining an equal firing separation between the combustion in the cylinders to result in equal time spacing in the firing of the successive cylinders under all running conditions while increasing the timing at which each individual cylinder fires.

2. In an internal combustion engine as set forth in claim 1 wherein the firing interval between cylinders is maintained uniformly but the firing order is changed when the amount of fuel delivered is reduced.

3. In an internal combustion engine as set forth in claim 1 wherein the fuel injection nozzles are supplied with fuel in response to the predetermined condition at greater intervals than 360 degrees.

4. In an internal combustion engine as set forth in claim 3 wherein the injection nozzles are supplied with fuel only every other revolution of the output shaft.

5. In an internal combustion engine as set forth in claim 3 wherein the predetermined condition is engine speed less than a predetermined speed.

6. In a internal combustion engine as set forth in claim 5 wherein the predetermined speed is determined by throttle valve position.

* * * * *